Dec. 18, 1928.  
J. A. B. SMITH  
1,695,700
ACCOUNTING MACHINE DEMONSTRATION CHART
Filed July 20, 1925 4 Sheets-Sheet 1
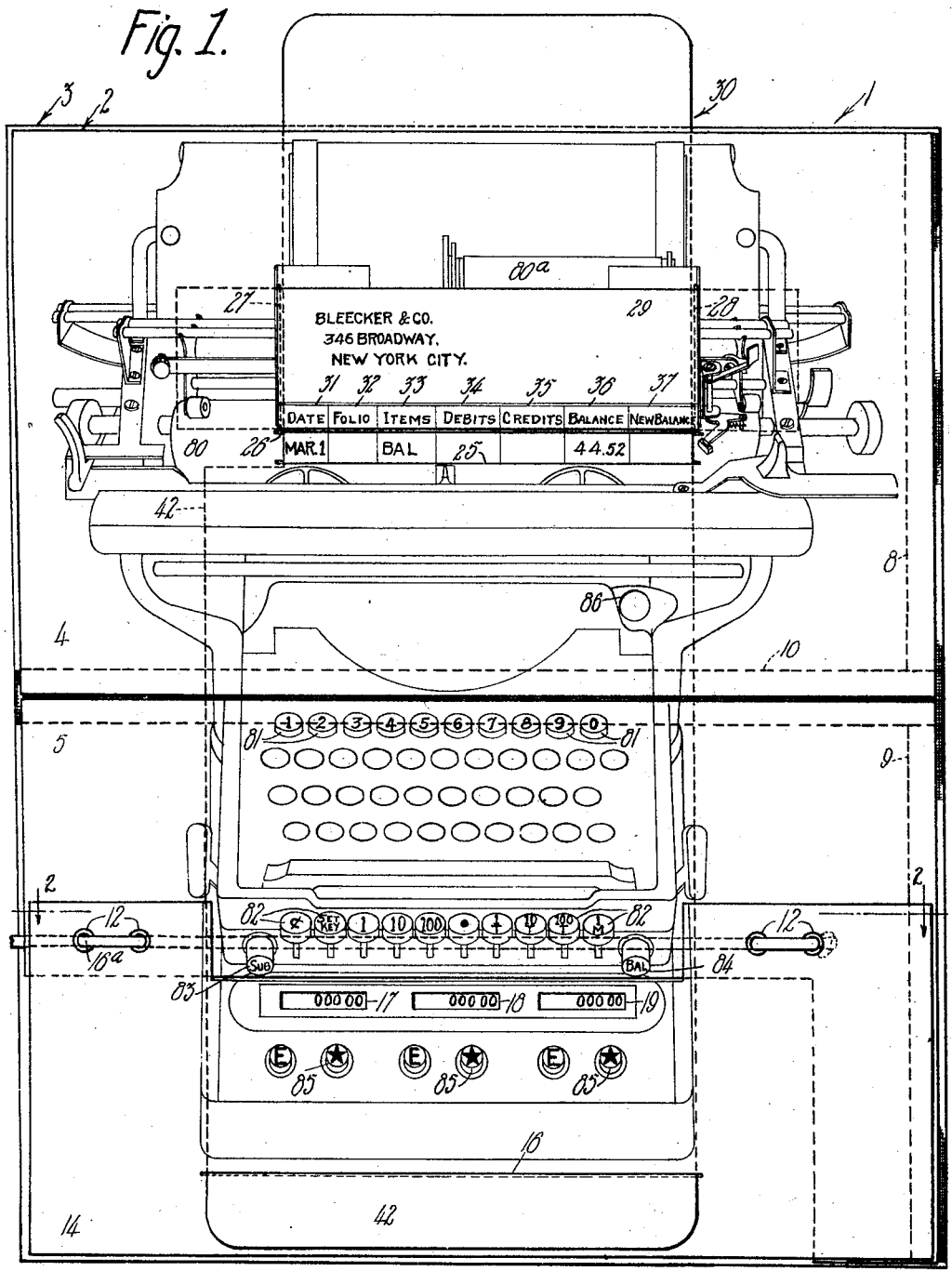
Fig. 1.
Fig. 2.
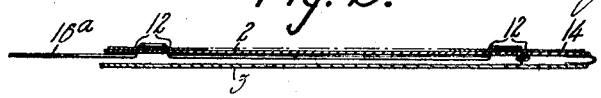
Inventor:
Jesse A. B. Smith
by B. C. Zickney
Attorney Dec. 18, 1928.
J. A. B. SMITH
1,695,700
ACCOUNTING MACHINE DEMONSTRATION CHART
Filed July 20, 1925    4 Sheets-Sheet 2
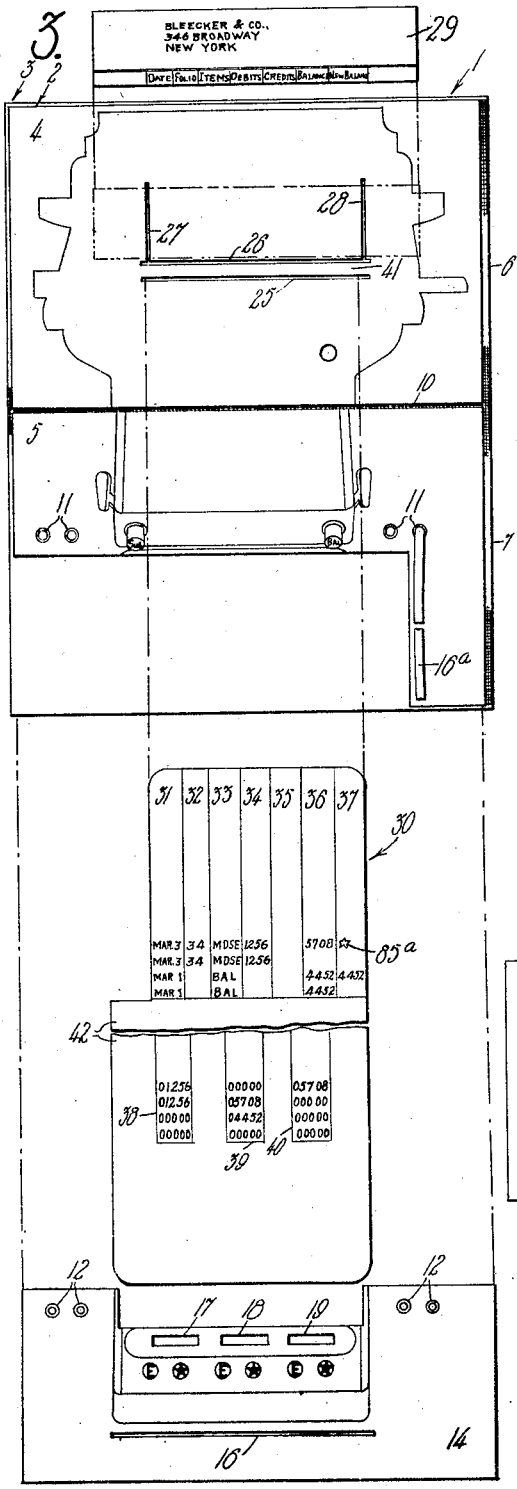
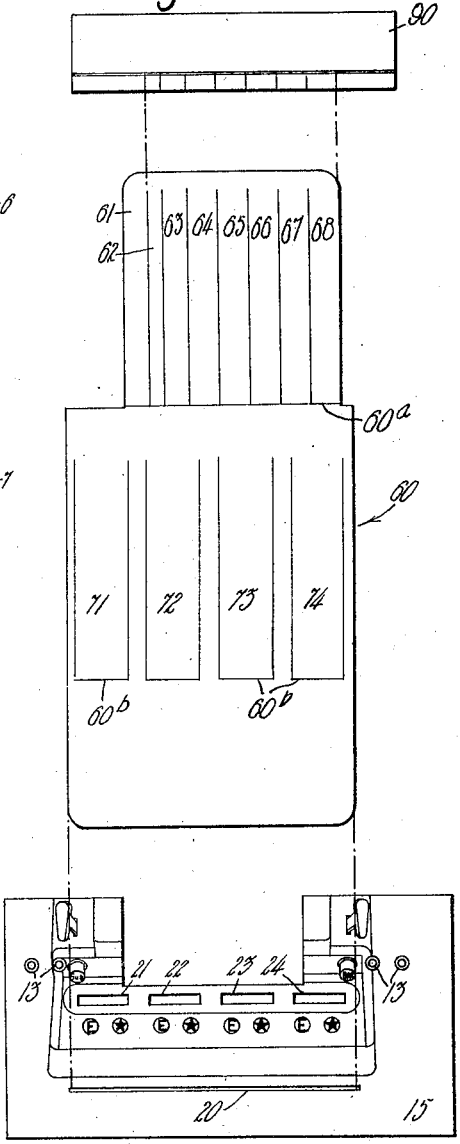
Inventor:
Jesse A. B. Smith
by B.C. Stickney
Attorney Dec. 18, 1928.  1,695,700
J. A. B. SMITH
ACCOUNTING MACHINE DEMONSTRATION CHART
Filed July 20, 1925   4 Sheets-Sheet 3
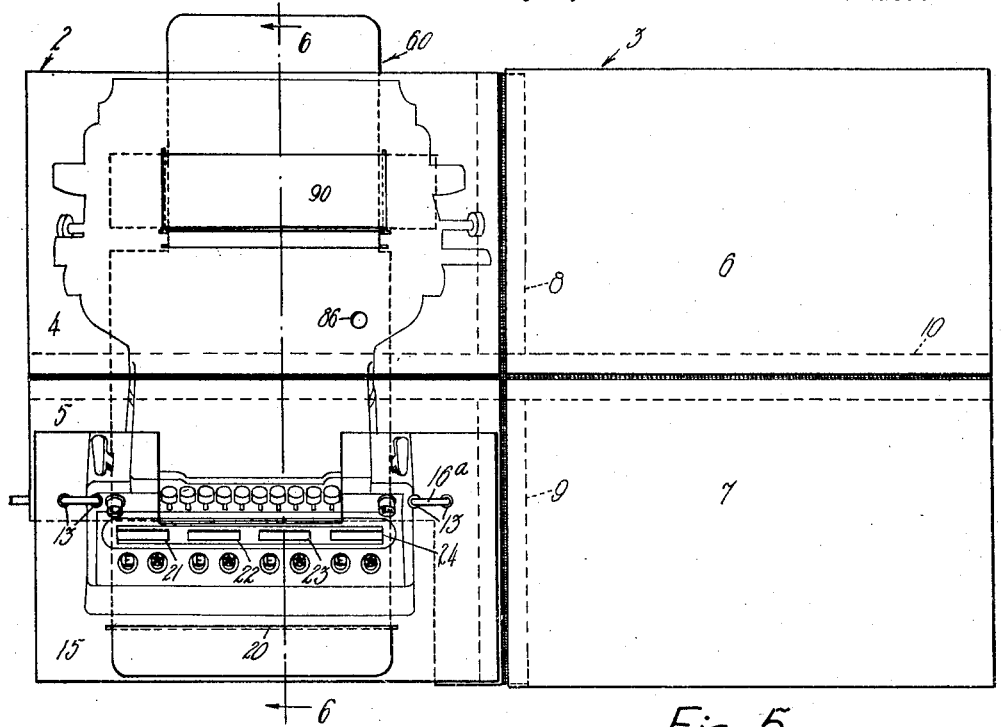
Fig. 5.
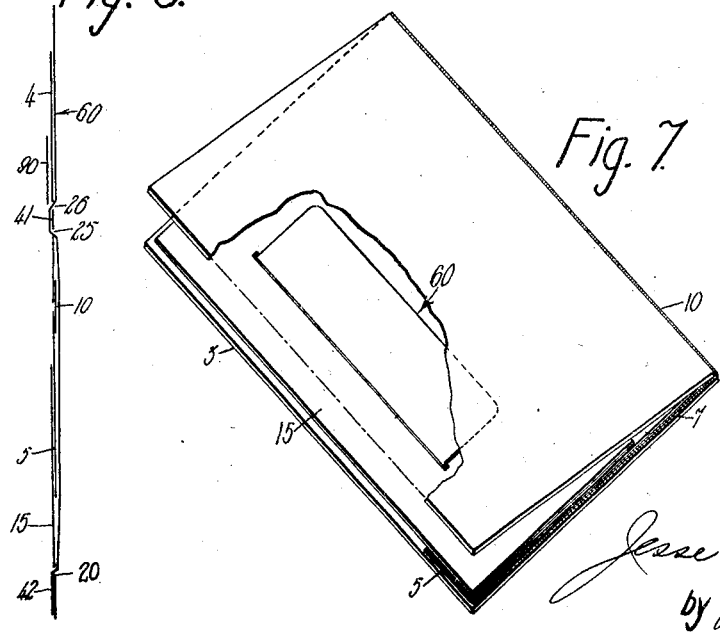
Fig. 6.
Fig. 7.
Inventor:
Jesse A. B. Smith
by B. C. Stickney
Attorney Dec. 18, 1928.                                          1,695,700
J. A. B. SMITH
ACCOUNTING MACHINE DEMONSTRATION CHART
Filed July 20, 1925        4 Sheets-Sheet 4
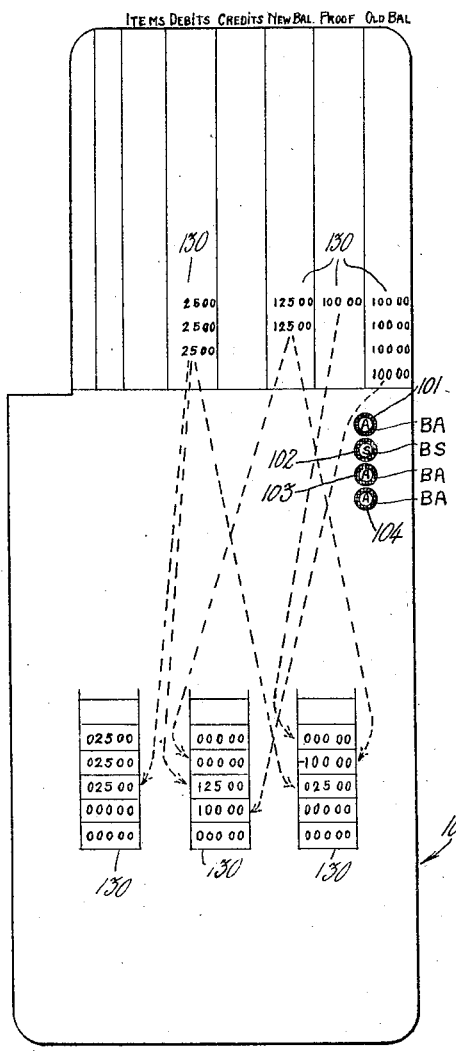
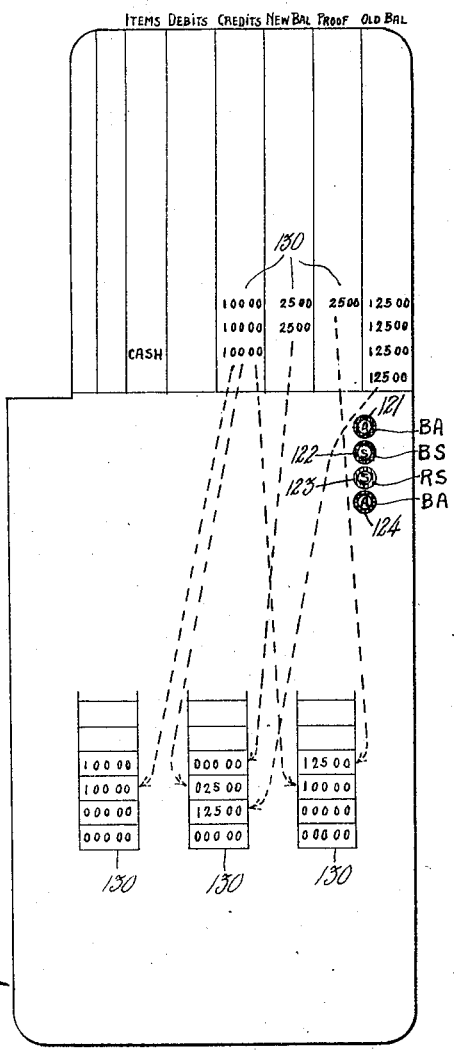
Inventor
Jesse A. B. Smith
by B. C. Stickney
Attorney Patented Dec. 18, 1928.

1,695,700

UNITED STATES PATENT OFFICE.

JESSE A. B. SMITH, OF STAMFORD, CONNECTICUT, ASSIGNOR TO UNDERWOOD ELLIOTT FISHER COMPANY, OF NEW YORK, N. Y., A CORPORATION OF DELAWARE.

ACCOUNTING-MACHINE DEMONSTRATION CHART.

Application filed July 20, 1925. Serial No. 44,682.

This invention relates to demonstrating devices or models for explaining the operations of a machine, especially bookkeeping machines, which are too heavy for convenient transportation.

A slide represents an actual account taken from a prospect's ledger and impresses the prospective customer forcibly. The salesman readily typewrites a slide representing an actual account of the kind to which the prospect is accustomed, and its large size makes a good impression and permits easy reading.

The large demonstrating device is reducible in size, at will, for transportation. One device can be used to demonstrate several accounts kept in different ways, some accounts on a three-register machine, and others on a machine having four or more registers.

Provision is made in the present invention of a cardboard frame including a top and bottom layer flexibly fastened together at a long edge. Each layer is divided crosswise into two equal parts flexibly fastened or bound together, and may be arranged to go in a brief-case or coat-pocket. The frame may have on its face a large picture of an Underwood bookkeeping machine. A lower portion of the top layers on which representations of the machine registers would have appeared is removed and cardboard pieces, one having thereon a picture of three registers and the other a picture of four or more registers, may be laced, one at a time, to the top layer. Suitable holes are made at each register, and two parallel slots are cut at the platen. Slides containing figures representing entries on ledger-sheets and other figures that would appear in the registers of an actual machine after each computing operation may be arranged, one at a time, between the layers. Figures, representing entries, may appear as on the platen, and associated figures may appear in proper register holes as the slide is pulled from one illustrative position to the next.

Other features and advantages will hereinafter appear.

In the accompanying drawings,

Figure 1 is a plan view of the device embodying my invention.

Figure 2 is a cross-section on a reduced scale along the line 2—2 of Figure 1.

Figure 3 is a plan view of the principal parts of the device needed for demonstrating a three-register bookkeeping machine, each part arranged in proper alignment with respect to the other parts, but not assembled therewith. An outline of the machine is shown on the face of the device.

Figure 4 is a plan view of parts employed with the frame of the device to demonstrate a four-register bookkeeping machine. Certain of the parts may be left blank for a salesman to fill in.

Figure 5 is a plan view of the device provided with elements for demonstrating a four-register bookkeeping machine, and shows the bottom layer of the frame developed or opened out. An outline only of the machine is shown on the face of the device.

Figure 6 is a diagrammatic longitudinal section along the line 6—6 of Figure 5.

Figure 7 is a perspective view of the device shown in Figure 5 partially folded, a portion of one layer shown broken away.

Figure 8 is a plan view of a slide arranged for demonstrating the handling of an account on a three-register bookkeeping machine. Characters indicating the nature of the different computing operations taking place in the machine are shown adjacent the right edge of the slide. Dotted lines leading from entry numerals to register numerals are shown to facilitate explaining the relations between different groups of numerals.

Figure 9 is a plan view of a slide arranged for demonstrating the handling on a three-register bookkeeping machine of a different account from that illustrated in Figure 8. Characters indicating the nature of the different computing operations taking place in the machine are shown adjacent the right edge of the slide. Dotted lines leading from entry numerals to register numerals are shown to facilitate explaining certain functions of the slide.

The device includes a rectangular frame 1 on which may appear a substantially full-size picture or photograph of an Underwood bookkeeping machine. The frame may have top and bottom layers 2 and 3 divided transversely into sections 4, 5 and 6, 7, respectively. The top and bottom layer sections 4 and 6 and 5 and 7 may be hinged together at the right side by strips of a binding consisting of flexible fabric 8 and 9, respectively. Sections 4 and 6 may be hinged as one unit to sections 5 and 7 as another unit by a flexible strip 10.

Section 5 (see Figure 3) may be arranged with a rectangular portion removed from its lower left-hand corner, and may have holes 11 arranged for registering with holes 12 and 13 in carboard pieces 14 and 15. Representations of separate registers do not appear on section 5. Three registers are shown on the cardboard piece 14 and four registers on the piece 15, and when these pieces are laced on section 5, one at a time, the registers will be properly positioned with respect to the other elements of the bookkeeping-machine picture on the face of frame 1.

A narrow slot 16 parallel to the adjacent bottom end of the machine picture and small rectangular holes or sight-openings 17, 18, 19 at the registers are cut in the piece 14, and a like slot 20 and like sight-openings 21, 22, 23 and 24 are cut in the piece 15. Two narrow slots 25 and 26 are cut at the representation of a platen 80 parallel thereto. Two short narrow slots 27 and 28 are arranged to extend upwardly from the upper slot 26 at right angles thereto, each positioned near an end of the slot 26. A cardboard slide 30 arranged for demonstrating a three-register bookkeeping machine has ruled columns 31, 32, 33, 34, 35, 36 and 37 with characters therein (except column 35) representing entries on a ledger-sheet, and it also has ruled columns 38, 39 and 40 with register figures therein. When the slide is assembled between layers 2 and 3, a guide for it is arranged by having the upper end of the slide come out through the slot 25, and re-enter through the slot 26. A strap 41 between the slots may serve as a stop for the slide by engaging an offset portion 42 of the same, which extends downwardly toward the lower end of the frame 1 and comes out through the slot 16, which thereby serves as a lower guide for the slide 30. The characters in columns 31, 32, 33, 34, 36 and 37 will appear over the strap 41 on the platen, and the figures in columns 38, 39 and 40 will appear in the register openings 17, 18 and 19 in definite relation to said characters at the platen as the slide 30 is manipulated. In like manner characters in columns 61, 62, 63, 64, 65, 66, 67 and 68 on slide 60 representing entries, and their associated register figures in columns 71, 72, 73 and 74 may appear in the proper sight-openings of frame 1 when it is arranged to demonstrate a four-register bookkeeping machine.

A card 29 bearing on its face a dummy heading of a ledger-sheet may be detachably fastened in the slots 27 and 28 so that the ledger-sheet heading appears to be held on a platen representation 80 and resting on a collating table 80ª. Several cards may be used with the frame 1. The ledger-sheet dummy appearing on a card 29 will preferably have columns and designations therefor arranged for a certain slide or slides 30. A card 29 may also have a dummy work-sheet heading on each face.

To have the device in a compact convenient form for transportation, frame 1 may be folded without a slide in it or as shown in Figure 7. In either case the bottom or right-hand layer 3 (see Figure 5) will preferably be swung over by means of the flexible strips 8 and 9 to overlie the normal upper layer 2 on which appears a photograph of the bookkeeping machine, thereby protecting the photograph from injury by the lace 16ª and other objects. It will be noted that the layer 3 by being flexibly connected to layer 2 with a space between them may have two functions. It normally serves as a bottom of frame 1, and also as a protecting cover for the machine photograph. To arrange the frame 1 in a small form to go in the salesman's brief-case or overcoat-pocket, the layers 2 and 3 are folded transversely. To obtain this end without detracting from the demonstration value of the machine photograph, the transverse dividing line between sections 4 and 5 is positioned where it does not touch any elements of the photograph on layer 2 made use of for demonstration purposes. A numeral-bearing slide employed with frame 1 will not, as a rule, be used many times and may therefore be integrally folded wherever convenient. Since it is intended that the frame shall give long service, and since its neat artistic appearance considerably increases its demonstrating value, the means described above whereby its good appearance may be preserved is of importance.

The machine represented on the frame 1 is similar to the Underwood standard bookkeeping machine. It has the platen representation 80 and representations of the usual type-bars, keys and number-bearing register disks. A group of numeral-keys is shown at 81. Other keys and control-buttons are shown at 82, 83, 84 and 85.

To begin a demonstration, the frame 1 may be placed flat on a desk, the slide 30 being in its uppermost position, exposing at the entry and register sight-openings sets of zeros or such numerals as may be desired for the particular demonstration. The frame 1 being held against movement by one hand, the slide is then slowly withdrawn by a pull on the offset portion 42 until the next succeeding sets of entry and register numerals are exposed at the sight-openings. Before moving the slide, the demonstrator may indicate the keys whose operation would produce a similar result in the actual machine.

To explain in more detail how the device may be used to demonstrate a three-register bookkeeping machine, the slide 30 at first is in its normal or uppermost position, thus exposing at each of the register sight-openings 17, 18 and 19 a set of zeros and exposing at the entry sight-opening the old balance $44.52, see Figure 3. The first operation to be demonstrated is picking up, i. e., causing to be shown in the middle register sight-opening the previous debit balance $44.52. To do this, the slide 30 is pulled downwardly until 44.52 appears in the new balance column 37. At the same time, this amount, which is typed in column 39, is thrown into the middle register opening 18, and it is also shown again in the old balance column 36 for reasons explained hereinafter. The next operation is to enter a debit of $12.56 for merchandise purchased March 3, posted in folio 34, which is demonstrated by pulling the slide down another step, thus exposing 12.56 in the debit column 34. This amount which is typed in column 38, is thrown into the register opening 17, which represents an accumulator register, and it is also added to the amount (44.52) previously run into the middle register opening 18. The next operation to be demonstrated by moving the slide is the typing of the balance (57.08), which amount is copied from the middle register. This amount, in the actual machine, is run into the register represented by column 40 additively and into the register represented by column 39 subtractively, and will therefore clear the latter register, thus proving that the balance was correctly transcribed. As another check the star of proof 85ª may be typed after the balance (57.08). It will be understood that where a group of figures immediately follows, i. e., comes above, a like group in the same column of the entry section of slide 30, only the first set will affect the figures in the register columns 38, 39 and 40, as is indicated by the dotted lines in Figures 8 and 9. Certain groups of figures in both the entry columns and the register columns are repeated to indicate that they will remain in view on or above the platen printing line, or in the registers of the actual machine during two or more operations.

To begin a new demonstration with the same slide 30, it is necessary to pull the slide back to its normal position where it is arrested by the offset portion 42 engaging the strap 41. To demonstrate the new slide 60, the old slide 30 may be removed from the frame 1. The card 29 bearing a dummy ledger-sheet heading is then removed and a new card 90 may be inserted. Then the slide 60 may be placed in frame 1 with its numerals arranged to appear in the proper sight-openings as described for slide 30.

In Figures 8 and 9 are shown slides 100 and 120 arranged for demonstrating accounts on a three-register bookkeeping machine. Slides 100 and 120 are printed with characters 101, 102, 103, 104 and 121, 122, 123, 124, respectively, some of which characters may be printed in different colors from the others. These characters will preferably be letters A and S representing abbreviations of "addition" and "subtraction". They automatically appear in the round sight-opening shown at 86 of an actual bookkeeping machine and indicate to the operator that the machine is set for an addition or subtraction operation, according to which letter appears. The color of the letter indicates whether the amount to be run into the registers is a credit item or a debit item. Black indicates debits and red indicates credits. Each indicator character has a reference line leading to one of the following explanatory pairs of letters "BA", "BS" or "RS", which represent abbreviations for "black addition", "black subtraction" and "red subtraction", respectively. It can be readily seen that these indicator letters on the slides 100 and 120 appearing in the sight-opening 86 of the layer 2 as the slides are manipulated make it easier in demonstrating a bookkeeping machine to explain the computing operations taking place in the machine. The dotted reference lines extending from entry numerals to register numerals on slides 100 and 120 are employed to indicate what registers are affected by running a certain group of entry numerals into the machine.

Demonstrations with slides 100 and 120 may be performed in like manner as described for slide 30 and the slides shown in the application of Julian S. Hexter, Serial No. 25,218, filed April 23, 1925, except that the functions of the indicator characters will need to be explained.

It can be readily seen that arranging frame 1 for use with a variable number of register sight-openings and for use with different cards bearing different dummy headings of ledger-sheets, permits the device to be used to demonstrate several accounts kept in ledgers in different ways or forms.

To permit a neat accurate slide representing an actual account to be readily prepared at a prospect's place of business, slides may be furnished, for use with the frame 1, which have blank entry and register columns, as shown in Figure 4. In such slides each group of register numerals must be positioned a distance below its associated group of entry numerals equal to the distance between the platen sight-opening (strap 41) and the register sight-openings 17, 18 and 19. To indicate where the first, i. e., lowest entry and register numerals are to be typed on the slide 60, starting lines 60ᵇ are provided the correct distance below starting line 60ª. The entry and register columns may also be divided into small sections or blocks, as shown at 110 and 130 in Figures 8 and 9. Each group of characters may then be positioned in its proper block.

Variations may be resorted to within the scope of the invention, and portions of the improvements may be used without others.

Having thus described my invention, I claim:

1. A demonstrating device for a bookkeeping machine including a frame having an upper layer and a second layer, said layers fastened together along one edge by a flexible fabric, to permit the second layer to fold under the upper layer, and a slide arranged between said layers, said upper layer having on its face a picture of said machine and being provided with elements for engaging with and guiding said slide, and apertures at the platen and register-elements of said picture, said slide bearing on its face numerals arranged to appear in said platen and said register-apertures as the slide is manipulated, said second layer being also foldable over the face of the upper layer to protect the same from wear and injury when out of use.

2. Two cards foldable face to face to form a book, with one folded card within the fold of the other card; said cards capable of assuming a co-operative relation when opened out and placed back to back; the upper of the cards having on its face the representation of a computing machine and perforated at certain reading points of said machine; and a movable paper strip supported between said cards and having a variety of indicia thereon capable of being exposed one after another through said perforations by step-by-step adjustments of said strip.

3. A device for demonstrating the operation of a bookkeeping machine, including a two-layer frame, a numeral-bearing slide disposed between the layers, the upper layer of said frame having a top portion arranged with a picture of said machine less representations of the register-elements of said machine, and a bottom portion arranged with representations of a plurality of registers, said top and bottom portions being fastened together at each side of said slide, so that the register-elements of said picture are properly aligned with the remainder of said picture, and the movement of said slide under said upper layer is permitted, said upper layer having sight-openings at said register-elements and sight-opening means at the printing zone of the platen-element of said picture.

4. A frame for a device for demonstrating the operation of a plurality of bookkeeping machines which are alike except that each machine has a different number of computing registers, said frame having an upper layer with its bottom portion cut away and a lower layer, said upper layer having a top portion which bears a picture of said machines less the register-elements thereof, said top portion being arranged with sight-opening means at the typing zone of the platen-element of said picture and with fastening means adjacent its bottom edge, whereby a representation of the register-elements of the machine it is desired to demonstrate may be detachably fastened to said top portion.

5. In a bookkeeping machine demonstrating device, in combination, a frame-member having a representation of said machine on its face, two slots, one above and one below the typing zone of the platen-element of said representation, and a slot extending upwardly at right angles at each end of the uppermost one of said platen-slots, a slide partly disposed below said frame-member and extending out through the lower one of said platen-slots and again below said frame-member through the upper one of said platen-slots, said slide bearing on its upper face vertical columns of a dummy ledger-sheet and entries therein to be exposed between said platen-slots, and a card arranged for detachable engagement in said vertical slots, so that its lower edge appears to be held on said platen representation, the face of said card bearing column-headings arranged for co-operation with the entries in the columns of said dummy ledger-sheet.

6. The combination, in a demonstrating device for a bookkeeping machine, with a frame bearing a picture on its face representing said machine, said frame having two slots extending upwardly from the platen-element of said picture, of a card having on its face a dummy work-sheet heading arranged for detachable engagement in said slots, so that said dummy work-sheet heading appears as resting on said platen-element.

7. A demonstrating device for a bookkeeping machine including a top layer provided with a picture of said machine on its face and platen and register sight-opening instrumentalities, means for exposing demonstration characters in said instrumentalities, and a lace-string, said top layer having an upper part and a lower part, each part bearing a section of said machine-picture centrally located thereon, and each part provided with a pair of holes on each side of its picture-section, the holes in said upper part arranged to register with the holes in said lower part, the two parts being laced together by said string, the latter being substantially disposed below said top layer, and the two picture-sections being properly joined to each other.

8. In a demonstrating device for a bookkeeping machine having a top layer with a picture of said machine on its face, means for protecting said picture when said device is not in use, said means including a lower layer normally underlying said top layer and having a flexible fabric connection therewith and arranged to be swung over on the top layer to protect said picture from injury.

9. The combination in a bookkeeping machine demonstrating device with a frame having an upper layer bearing on its face a picture of said machine and a lower layer hinged to the upper layer, of a numeral-bearing slide partially disposed between said layers, said upper layer having a strap formed by two slots at and parallel to the platen-element of said machine-picture, aperture, apertures at the register-elements of said picture for exposing certain numerals of said slide, and a guide-slot for said slide downwardly positioned from the bottom end of said picture and parallel thereto, said slide having its upper portion narrower than its lower portion and arranged for extending outwardly through the lower of said platen-slots and re-entering through the upper platen-slot whereby certain numerals of said slide may be exposed over said strap and appear as being typed on a work-sheet in place on said platen-element, the upward movement of said slide being arrested by said strap, and the lower end of said slide being arranged to project through said guide-slot in said upper layer to form a tab for manipulating said slide.

10. A device for demonstrating the operation of a typewriting and computing machine which is provided with an automatic indicator for telling the operative of said machine what kind of computing operation the machine is set to perform at any time, said device including a plate having on its face a representation of said machine, two parallel slots, one above and one below the printing zone of the platen-element of said representation, sight-openings at the register-elements of said representation, a sight-opening at the indicator-element of said representation, and a guide-slot positioned a short distance downwardly from and parallel to the bottom edge of said machine-representation, and a slide disposed partly under said plate, the upper portion of said slide extending outwardly through the lower one of said platen-slots and inwardly below said plate again through the upper one of said platen-slots, the lower portion of said slide extending outwardly through said guide-slot, said slide bearing on its upper face figures representing entries on a ledger-sheet positioned to be exposed between said platen-slots, figures representing computation results as would be shown in the actual registers of said machine when said entries are run into said machine in accordance with the character of each entry, said computation figures being positioned to be exposed in said register sight-openings, said slide further bearing characters which are positioned to appear in said indicator sight-opening upon manipulation of said slide in said slots for demonstrating how the operative of the actual typewriting and computing machine is kept informed as to the kind of computation the machine is set to perform at any particular time.

11. A folding frame for a bookkeeping machine demonstrating device, including a normally flat upper plate having a top portion and a bottom portion, a lower plate normally disposed under said upper plate, and laces for detachably fastening said upper plate portions together, said top portion bearing upon its face a representation of said machine less the representation of the register-elements of said machine and having sight-openings at the platen-element and computing operation indicator-element of said representation, said bottom portion bearing a representation of the register-elements of said machine and having apertures at said register-elements, said top portion being transversely divided and flexibly hinged together at a point between the representations of numeral-key elements and said indicator-element of the machine, said lower plate being transversely divided directly under the transverse dividing line of said top portion, the lower transversely-divided plate-sections being hinged together, said upper and lower plates being further hinged together along a side edge, said normally-disposed lower plate being capable of swinging over on top of said upper plate to protect the picture thereon from injury and thereafter the top and bottom plates being capable of folding about their transverse hinges, so as to bring the apertures in said upper plate on the inside of the resultant folded structure, thereby protecting said apertures from injury when said frame is compactly arranged for transportation.

12. A device for demonstrating the operation of a bookkeeping machine, including a frame having a normal upper layer and a normal lower layer hinged at one side edge to the upper layer which bears on its face a representation of said machine and has two parallel slots disposed lengthwise of the printing zone of the platen-element of said representation and other sight-openings at the register-elements of said representation, and a slide movable between said layers and passing out therefrom through the lower one of said platen-slots and in again through the upper one of said slots in said layers, said slide having thereon predetermined demonstration characters positioned for being exposed between said slots, and other demonstration characters co-operating with the first-named characters and being positioned to be exposed in said register sight-openings, the latter being arranged in a bottom portion of said upper layer which is detachable from the remainder of said frame, whereby the latter may be arranged with another bottom portion having a different number of register-elements.

13. A device for demonstrating a bookkeeping machine, including an upper layer bearing on its face a representation of said machine and having sight-openings through it at the platen and register elements of said representation, a slide bearing demonstration figures positioned to be exposed in said sight-openings, a second layer, and means for fastening said layers together in a back-to-back relation with said slide between them and said second layer under the upper layer, said means also permitting said layers to be disposed in a face-to-face relation, whereby said machine representation is protected from injury by said second layer when said device is not in use.

JESSE A. B. SMITH.